(12) United States Patent
Yang et al.

(10) Patent No.: US 11,246,048 B2
(45) Date of Patent: Feb. 8, 2022

(54) CHANNEL MEASUREMENT PROCESSING METHOD AND DEVICE

(71) Applicant: VIVO MOBILE COMMUNICATION CO., LTD., Chang'an Dongguan (CN)

(72) Inventors: Xiaodong Yang, Chang'an Dongguan (CN); Xiaodong Sun, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 105 days.

(21) Appl. No.: 16/621,473

(22) PCT Filed: Jun. 12, 2018

(86) PCT No.: PCT/CN2018/090802
§ 371 (c)(1),
(2) Date: Dec. 11, 2019

(87) PCT Pub. No.: WO2018/228367
PCT Pub. Date: Dec. 20, 2018

(65) Prior Publication Data
US 2020/0196175 A1  Jun. 18, 2020

(30) Foreign Application Priority Data
Jun. 16, 2017  (CN) .......................... 201710459744.3

(51) Int. Cl.
*H04W 4/00* (2018.01)
*H04W 24/08* (2009.01)
(Continued)

(52) U.S. Cl.
CPC ........... *H04W 24/08* (2013.01); *H04L 5/0055* (2013.01); *H04W 24/10* (2013.01)

(58) Field of Classification Search
CPC ...... H04W 24/08; H04W 24/10; H04L 5/0055
(Continued)

(56) References Cited

U.S. PATENT DOCUMENTS 8,902,842 B1 * 12/2014 Gomadam ............. H04L 5/005
370/329
2012/0250549 A1  10/2012 Lee et al.
(Continued)

FOREIGN PATENT DOCUMENTS

CN  102271359 A  12/2011
CN  103581992 A   2/2014
(Continued)

OTHER PUBLICATIONS

Chinese Office Action Application No. 201710459744.3; dated Nov. 29, 2019.
(Continued)

*Primary Examiner* — Thai D Hoang
(74) *Attorney, Agent, or Firm* — von Briesen & Roper, s.c.

(57) ABSTRACT

Embodiments of the present disclosure provide a channel measurement processing method and a channel measurement processing device. The method includes: receiving a channel measurement command sent by a base station; parsing the channel measurement command according to a preset rule to obtain an operation object and an operation type of the channel measurement command; where the operation object of the channel measurement command is a measurement resource or a measurement report; and, executing a first operation, corresponding to the operation type, on the measurement resource, and/or, executing a second operation, corresponding to the operation type, on the measurement report.

20 Claims, 2 Drawing Sheets

(51) Int. Cl.
*H04L 5/00* (2006.01)
*H04W 24/10* (2009.01)

(58) Field of Classification Search
USPC ............... 370/329–330, 335–345, 347–348, 370/252–256
See application file for complete search history.

(56) References Cited

U.S. PATENT DOCUMENTS

| | | | |
|---|---|---|---|
| 2013/0258995 A1* | 10/2013 | Skov | H04W 72/0406 370/329 |
| 2013/0279356 A1* | 10/2013 | Park | H04B 7/0695 370/252 |
| 2013/0322376 A1* | 12/2013 | Marinier | H04W 72/06 370/329 |
| 2014/0003269 A1* | 1/2014 | Golitschek Edler von Elbwart | H04L 5/003 370/252 |
| 2014/0031007 A1 | 1/2014 | Gao et al. | |
| 2014/0301238 A1* | 10/2014 | Chun | H04B 7/0456 370/252 |
| 2014/0313915 A1 | 10/2014 | Lee et al. | |
| 2014/0348015 A1* | 11/2014 | Seo | H04W 24/10 370/252 |
| 2015/0146644 A1* | 5/2015 | Kim | H04L 5/0035 370/329 |
| 2015/0207601 A1* | 7/2015 | Kim | H04L 5/005 370/329 |
| 2015/0271755 A1* | 9/2015 | Karri | H04W 28/0221 370/252 |
| 2015/0280878 A1* | 10/2015 | Lee | H04L 5/0048 370/252 |
| 2015/0319633 A1 | 11/2015 | Ji et al. | |
| 2016/0135194 A1 | 5/2016 | Kim et al. | |
| 2017/0208521 A1 | 7/2017 | Wu et al. | |
| 2017/0374574 A1 | 12/2017 | Lee et al. | |
| 2018/0175983 A1* | 6/2018 | Yum | H04L 5/0053 |
| 2018/0241446 A1* | 8/2018 | Fakoorian | H04B 7/0854 |
| 2018/0288746 A1* | 10/2018 | Zhang | H04L 1/0031 |
| 2019/0150161 A1* | 5/2019 | Cheng | H04L 5/0023 370/330 |
| 2019/0356438 A1* | 11/2019 | Lee | H04B 7/0695 |
| 2019/0356439 A1* | 11/2019 | Lee | H04B 7/0408 |
| 2020/0053607 A1* | 2/2020 | Ingale | H04W 36/0058 |
| 2020/0067735 A1* | 2/2020 | Gao | H04B 7/0417 |
| 2020/0196175 A1* | 6/2020 | Yang | H04W 24/08 |
| 2020/0304192 A1* | 9/2020 | Yum | H04L 5/0094 |
| 2021/0067220 A1* | 3/2021 | Abdelghaffar | H04L 5/0057 |
| 2021/0119688 A1* | 4/2021 | Enescu | H04W 72/1273 |
| 2021/0152234 A1* | 5/2021 | Zhou | H04B 7/088 |
| 2021/0152235 A1* | 5/2021 | Zhou | H04W 72/042 |
| 2021/0153040 A1* | 5/2021 | Zhou | H04L 5/001 |

FOREIGN PATENT DOCUMENTS

| | | |
|---|---|---|
| CN | 103581996 A | 2/2014 |
| CN | 105122666 A | 12/2015 |
| CN | 105359569 A | 2/2016 |
| CN | 105392148 A | 3/2016 |
| EP | 3193532 A1 | 7/2017 |
| WO | WO 2014/024025 A1 | 2/2014 |
| WO | 2014049868 A1 | 4/2016 |
| WO | WO 2016/108504 A1 | 7/2016 |
| WO | WO 2016/204546 A1 | 12/2016 |

OTHER PUBLICATIONS

Chinese Search Report Application No. 201710459744.3; dated Apr. 16, 2019.
European Search Report Application No. 18818031.9; dated May 19, 2020.
International Search Report & Written Opinion related to Application No. PCT/CN2018/090802; dated Sep. 19, 2018.
3$^{rd}$ Generation Partnership Project; Technical Specification Group Radio Access work; Study on New Radio Access Technology, 3GPP TR 38.912 V0.1.0 (Jan. 2017) (Release 14).
Nokia, Alcatel-Lucent Shanghai Bell; "Beam Recovery in NR"; 3GPP TSG-RAN WG2 NR Adhoc, R2-1700075, Spokane, USA Jan. 17, 2017-Jan. 19, 2017.
LG Electronics; "Views on CSI acquisition for NR", 3GPP TSG RAN WG1 Meeting #86b, R1-1609253, Lisbon, Portugal Oct. 10, 2016-Oct. 14, 2016.
NTT DOCOMO.; "CSI Acquisition Schemes for NR", 3GPP TSG RAN WG1 NR Ad-Hoc Meeting, R1-1700596, Spokane, US Jan. 16, 2017-Jan. 20, 2017.
Intel Corporation; "Further discussion on NR CSI acquisition signaling", 3GPP TSG RAN WG1 #88, R1-1702204, Athens, Greece, Feb. 13, 2017-Feb. 17, 2017.
Samsung; "Discussions on periodic and semi-persistent CSI reporting for NR", 3GPP TSG RAN WG1 Meeting #88, R1-1702944, Athens, Greece Feb. 13, 2017-Feb. 17, 2017.
European Office Action for related Application No. 18818031.9; dated Apr. 9, 2021.

* cited by examiner

CHANNEL MEASUREMENT PROCESSING METHOD AND DEVICE

CROSS-REFERENCE TO RELATED APPLICATION

This application is the U.S. national phase of PCT Application PCT/CN2018/090802 filed on Jun. 12, 2018, which claims a priority to Chinese Patent Application No. 201710459744.3 filed on Jun. 16, 2017, the disclosures of which are incorporated in their entirety by reference herein.

TECHNICAL FIELD

The present disclosure relates to the field of communication technologies, in particular to a channel measurement processing method and a device.

BACKGROUND

Radio access technology standards, such as Long Term Evolution (LTE)/LTE-A (LTE-Advanced), are built on the basis of the MIMO plus the Orthogonal Frequency Division Multiplexing (OFDM) technology. The MIMO technology utilizes the spatial freedom that multi-antenna systems can achieve to improve peak rate and system spectrum utilization. Massive MIMO technology uses a large-scale antenna array and uses digital-analog hybrid beamforming technology, that is, based on the traditional digital domain beamforming, a first-order beamforming is added to a RF signal at the position closed to the front end of the antenna system. Analog beamforming enables a relatively coarse match between the transmitted signal and the channel in a relatively simple way.

At present, in the academic and industrial, the training of the simulated beamforming vector is usually performed by means of roll polling, that is, the array elements of each polarization direction of each antenna panel sequentially transmit the training signals in the time-division multiplexing manner at the appointed time (i.e., the candidate beamforming vectors), and the terminal feedbacks the beam measurement report after the measurement is performed, which is for the network side using the training signal to implement the analog beam transmission in the next transmission service. The content of the beam measurement report typically includes several optimal transmit beam identifiers and the measured received power of each transmit beam.

Beam management mainly refers to processes such as beam measurement, beam reporting, and beam indication, etc. in beam management, it is necessary to use transmit beam sweeping (Tx beam sweeping) and receiving beam sweeping (Rx beam sweeping) to measure the optimal transmit and receive beam pair link (BPL). At present, beam sweeping of beam management supports beam measurement using a UE-specific Channel State Information Reference Signal (CSI-RS). The information included in the CSI-RS configuration includes: number of CSI-RS resources, number of times of time domain repetition associated with each CSI-RS resource, a CSI-RS resource pattern (RE pattern), number of CSI-RS antenna ports, a CSI-RS cycle.

The CSI-RS measurement resource activation/deactivation command is introduced in R14, here, the semi-continuous CSI-RS measurement report is not introduced, and the activation/deactivation of the semi-continuous CSI-RS measurement report is not introduced. The CSI-RS measurement report introduced at the time is bound to the activation/deactivation of the CSI-RS measurement resource. If the CSI-RS measurement resource is activated, the CSI-RS measurement report is activated; if the CSI-RS measurement resource is deactivated, the CSI-RS measurement report is deactivated, which causes waste of resources, because in many scenarios, when the measurement resource is activated, the measurement report may not be reported, that is, the measurement report can be deactivated at this time.

The method in the related art performs binding control on measurement reports and measurement resources, resulting in waste of resources.

SUMMARY

In a first aspect, a channel measurement processing method is provided, the method is applied to a mobile terminal and includes:

receiving a channel measurement command sent by a base station;

parsing the channel measurement command according to a preset rule to obtain an operation object and an operation type of the channel measurement command; where the operation object of the channel measurement command is a measurement resource or a measurement report; and executing a first operation, corresponding to the operation type, on the measurement resource, and/or, executing a second operation, corresponding to the operation type, on the measurement report;

where the operation type includes a deactivation operation, an activation operation, or a pause operation.

In a second aspect, a channel measurement processing device is provided and includes:

a command receiving module, configured to receive a channel measurement command sent by a base station;

a command parsing module, configured to parse the channel measurement command according to a preset rule to obtain an operation object and an operation type of the channel measurement command; where the operation object of the channel measurement command is a measurement resource or a measurement report; and a command execution module, configured to execute a first operation, corresponding to the operation type, on the measurement resource, and/or, execute a second operation, corresponding to the operation type, on the measurement report;

where the operation type includes a deactivation operation, an activation operation, or a pause operation.

In a third aspect, a terminal device is provided and includes a processor, a memory and a computer program stored in the memory and executable by the processor. When the computer program is executed by the processor, the processor implements steps of the above channel measurement processing method.

In a fourth aspect, a computer readable storage medium is provided and includes a computer program stored thereon. The computer program is executed by a processor to implement steps of the above channel measurement processing method.

BRIEF DESCRIPTION OF DRAWINGS

In order to more clearly illustrate the technical solutions of the embodiments of the present disclosure and the related technology, the drawings used in the description of the embodiments and the related technology will be briefly described below. It is obvious that the drawings in the following description are only some embodiments of the present disclosure. Other drawings may be obtained by those skilled in the art based on the drawings without any inventive efforts.

DETAILED DESCRIPTION

The specific embodiments of the present disclosure are further described below in combination with the accompanying drawings. The following embodiments are only used to more clearly illustrate the technical solutions of the present disclosure, and are not intended to limit the scope of the disclosure.

Figure 1:
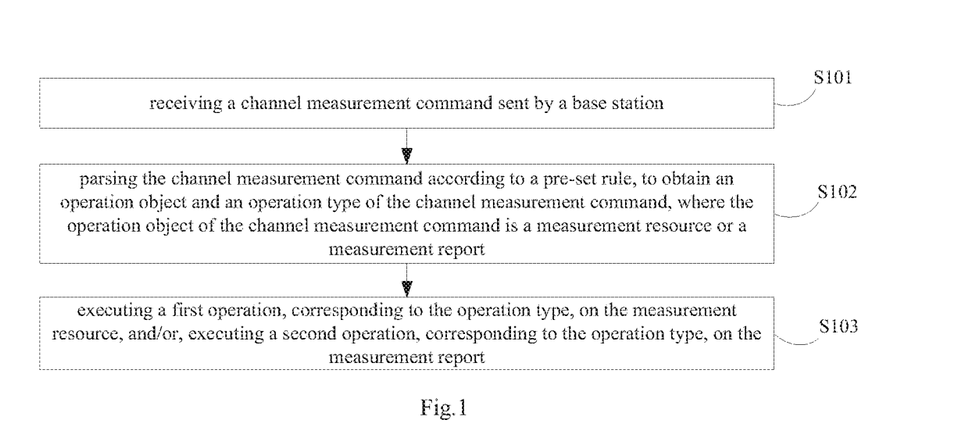
FIG. 1 is a schematic flowchart illustrating a channel measurement processing method according to an embodiment of the present disclosure.

FIG. 1 is a schematic flowchart illustrating a channel measurement processing method according to an embodiment of the present disclosure, including steps 101-103.

In step 101, a channel measurement command sent by a base station is received.

The channel measurement command is a command sent by the base station to the mobile terminal for performing beam measurement on the channel.

Specifically, the channel measurement command may include: activation command for a measurement report, deactivation command for a measurement report, activation command for a measurement resource, and deactivation command for a measurement resource.

The measurement resource is a resource issued by the base station to the mobile terminal for performing beam measurement on the channel.

The measurement report is a report formed by the mobile terminal performing beam measurement according to the measurement resource, and the mobile terminal reports the measurement report to the base station.

In step 102, the channel measurement command is parsed according to a preset rule, and an operation object and an operation type of the channel measurement command are obtained; wherein the operation object of the channel measurement command is a measurement resource or a measurement report.

The preset rule is a rule predetermined for processing the channel measurement command The operation object is the measurement resource or the measurement report, that is, the operation object may be the measurement report or the measurement resource.

The operation type includes a deactivation operation, an activation operation, or a pause operation.

Specifically, the deactivation operation of the measurement resource is to maintain the deactivation state of the base station, and the base station stops issuing the measurement resource to the mobile terminal; the activation operation of the measurement resource is to maintain the activation state of the base station, and the base station continuously issues the measurement resource to the bile terminal; the pause operation of the measurement resource is to maintain the deactivate/activate state of the base station, so that the base station presents a pause state, while the base station stops issuing the measurement resource to the mobile terminal; the deactivation operation of the measurement report is that the mobile terminal stops reporting the measurement report to the base station; the activation operation of the measurement report is that the mobile terminal continuously reports the measurement report to the base station; the pause operation of the measurement report is to maintain the deactivated/activated state of the mobile terminal, so that the mobile terminal presents the pause state, while the base station stops reporting the measurement report to the mobile terminal.

It should be noted that, one measurement resource may correspond to one measurement report, or, one measurement resource may also correspond to a plurality of the measurement reports, or, a plurality of measurement resources may correspond to one measurement report.

In step 103, a first operation corresponding to the operation type is executed on the measurement resource, and/or a second operation corresponding to the operation type is executed on the measurement report.

The first operation corresponding to the operation type is executed on the measurement resource, for example: when the deactivation command of the measurement resource is received, the corresponding first operation may include: recording or determining that the base station has performed the corresponding deactivation or activation operation on the measurement resource.

The first operation is an operation corresponding to the measurement resource and the operation type.

The second operation is an operation corresponding to the measurement report and the operation type.

Here, it should be noted that "and/or" refers to at least one of the objects to which they are connected.

In this embodiment, different operation objects (measurement reports and measurement resources) and operation types of the channel measurement commands are distinguished to perform different operations of the operation object, which solves the problem of waste of resources caused by binding the measurement report and the measurement resources in the existing method and then achieves the technical effort of saving resources by separately controlling measurement reports and measurement resources.

Further, on the basis of the above method embodiment, the step 103 specifically includes:

if the operation object is the measurement resource and the operation type is the deactivation operation or the activation operation, recording or determining that the base station has performed the corresponding deactivation or activation operation on the measurement resource, and/or, performing the corresponding deactivation or activation operation on the measurement report.

Specifically, when the mobile terminal receives the deactivation activation/deactivation command of the measurement resource sent by the base station, the mobile terminal may perform the following operations:

only recording or determining that the base station has performed the corresponding deactivation or activation operation on the measurement resource;

or, only performing the corresponding deactivation or activation operation on the measurement report;

or, recording or determining that the base station has performed the corresponding deactivation or activation operation on the measurement resource, and performing the corresponding deactivation or activation operation on the measurement report.

This embodiment is to solve the problem that the measurement report and the measurement resource may be inconsistent after the activation/deactivation operation of the measurement report is separately managed from the activation/deactivation operation of the measurement resource. For example, if the measurement resource is deactivated, but the measurement report is not deactivated, at this point, the mobile terminal cannot learn whether it is still required to report the measurement report to the base station.

Further, on the basis of the above method embodiment, the step 103 specifically includes:

if the operation object is the measurement resource and the operation type is the deactivation operation, setting the measurement report to the pause state, stopping sending the measurement report to the base station, and recording or determining status of the measurement report;

where the status of the measurement report includes an activation state or a deactivation state.

Specifically, when the mobile terminal receives the deactivation command of the measurement resource sent by the base station, the mobile terminal sets the measurement report to the pause state, stops sending the measurement report to the base station, and records and determines the status of the measurement report.

By setting the measurement report to the pause state, it is convenient to perform directly recovery, when the activation command of the measurement resource sent by the base station is subsequently received and the status of the measurement report is the activation state. This can reduce the operation and save resources.

Further, on the basis of the above method embodiment, the step 103 specifically includes:

if the operation type is the activation operation, the measurement report is in the pause state, and the status of the measurement report is the activation state, recovering the activation state of the measurement report, and continuing to send the measurement report to the base station.

Specifically, when the mobile terminal receives the activation command of the measurement resource sent by the base station, if the measurement report is in the pause state and the status of the measurement report is the activation state, the mobile terminal can directly recover the activation state of the measurement report and continues to send the measurement report to the base station, which reduces the operation and saves resources.

or, when the mobile terminal receives the activation command of the measurement report sent by the base station, if the measurement report is in the pause state and the status of the measurement report is the activation state, the mobile terminal can directly recover the activation state of the measurement report, and continues to send the measurement report to the base station, which reduces the operation and saves resources.

Further, on the basis of the above method embodiment, the step 103 specifically includes:

if the operation type is the deactivation operation or the activation operation, notifying a physical layer to perform the corresponding deactivation or activation operation, so that the physical layer correspondingly stops or continues receiving the measurement resource.

In order to save resources in tune, when receiving the channel measurement command sent by the base station, the mobile terminal needs to notify the physical layer of the mobile terminal to perform the corresponding deactivation or activation operation, and the physical layer correspondingly stops or continues receiving the measurement resource.

Further, on the basis of the above method embodiment, the step 103 specifically includes:

if the operation object is the measurement report, and the operation type is the deactivation or activation operation, recording or determining that the base station has performed the corresponding deactivation or activation operation on the measurement resource, and/or, setting status of the measurement report to a corresponding deactivation or activation state, and performing the corresponding deactivation or activation operation on the measurement report.

Specifically, when the mobile terminal receives the deactivation activation/deactivation command of the measurement report sent by the base station, the mobile terminal may perform the following operations:

only recording or determining that the base station has performed the corresponding deactivation or activation operation on the measurement resource;

or, only setting the status of the measurement report to the corresponding deactivation or activation state, and performing the corresponding deactivation or activation operation on the measurement report;

or, recording or determining that the base station has performed the corresponding deactivation or activation operation on the measurement resource, setting the status of the measurement report to the corresponding deactivation or activation state, and performing the corresponding deactivation or activation operation on the measurement report This embodiment is to solve the problem that the measurement report and the measurement resource may be inconsistent, after the activation/deactivation operation of the measurement report is separately managed from the activation/deactivation operation of the measurement resource.

Further, on the basis of the above method embodiment, the performing the corresponding deactivation or activation operation on the measurement report in the step S103 specifically includes:

after a preset quantity of sub-frames or a preset quantity of slots, performing the corresponding deactivation or activation operation on the measurement report.

Specifically, after the activation/deactivation operation of the measurement report is separately managed from the activation/deactivation operation of the measurement resource, the most ideal state is that the activation/deactivation operation of the measurement report and the activation/deactivation operation of the measurement resource are simultaneously received, and the mobile terminal can perform correspondingly. However, in the actual communication procedure, commands are always received in a sequence. In this case, by setting a preset quantity of sub-frames or a preset quantity of slots, it is possible to avoid repeated operations and waste resources when the mobile terminal receives channel measurement commands of different operation types for the same measurement object.

Further, on the basis of the above method embodiment, the step 103 specifically includes steps S1031 and S1032.

In step S1031, if the operation object is the measurement resource, the operation type is the deactivation operation, and the measurement report is in an activation state, replacing the measurement resource.

In step S1032, when a new channel measurement command is received, if it is determined that an operation target of the new channel measurement command is the measurement report, and an operation type of the new channel measurement command is the deactivation operation, stopping sending the measurement report to the base station.

Specifically, the measurement report includes a channel state information reference signal CSI-RS measurement report and a beam measurement report.

When reporting the CSI-RS measurement report, the measurement resource is a CSI-RS measurement resource or a demodulation reference signal DMRS measurement resource.

When reporting the beam measurement report, the measurement resource is the CSI-RS measurement resource or a synchronization information block (SS Block) measurement resource.

For example, after the deactivation command of the CSI-RS measurement resource is received and the CSI-RS measurement report is in an activation state, then the CSI-RS measurement report continues to be reported, and the CSI-RS measurement resource is replaced with the DMRS measurement resource, and reporting of the CSI-RS measurement report is stopped until the deactivation command of the CSI-RS measurement report is received.

In another embodiment, after the deactivation command of the CSI-RS measurement resource is received and the beam measurement report is in the activation state, then the beam measurement report continues to be reported, and the measurement resource is replaced with the SS Block, and reporting of the beam measurement report is stopped until the deactivation command of the beam measurement report is received.

By replacing the measurement resource, the operation of the mobile terminal is maintained, while resources can be saved.

Further, on the basis of the above method embodiment, the method further includes step S104.

In step S104, the channel measurement command is ignored according to the preset rule.

Specifically, when the mobile terminal receives the channel measurement command sent by the base station, if it is determined according to a predetermined rule that the mobile terminal can maintain the current state, the channel measurement command is ignored to save resources.

Further, on the basis of the above method embodiment, the step 104 specifically includes:

if status of the operation object corresponds to the operation type, the channel measurement command is ignored.

The status of the operation object includes an activation state or a deactivation state.

Specifically, the operation object is a measurement report or a measurement resource, therefore, the status of the measurement report includes an activation state or a deactivation state, and the status of the measurement resource also includes an activation state or a deactivation state.

For example, the status of the operation object corresponding to the operation type may include the following cases:

1) the measurement report is in an activation state, and an activation command of the measurement resource is received;

2) the measurement report is in a deactivation state, and a deactivation command of the measurement resource is received;

3) the measurement report is in an activation state, and an activation command of the measurement report is received;

4) the measurement report is in a deactivation state, and a deactivation command of the measurement report is received;

5) the measurement resource is in an activation state, and an activation command of the measurement resource is received;

6) the measurement resource is in a deactivation state, and a deactivation command of the measurement resource is received;

7) the measurement resource is in an activation state, and an activation command of the measurement report is received;

8) the measurement resource is in a deactivation state, and a deactivation command of the measurement report is received.

By determining correspondence between the status of the specific operation object and the operation type, the channel measurement command may be ignored, thereby saving resources.

Figure 2:
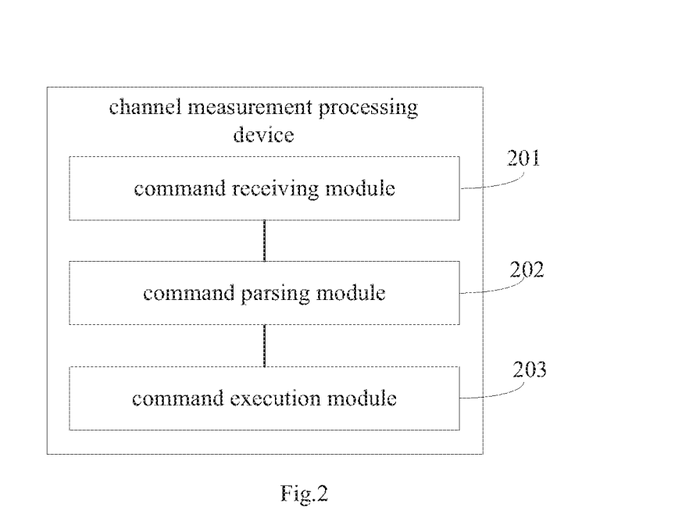
FIG. 2 is a schematic structural diagram illustrating a channel measurement processing device according to an embodiment of the present disclosure.

FIG. 2 is a schematic structural diagram illustrating a channel measurement processing device according to an embodiment of the present disclosure, and the device includes: a command receiving module 201, a command parsing module 202 and a command execution module 203.

The command receiving module 201 is configured to receive a channel measurement command sent by a base station.

The command parsing module 202 is configured to parse the channel measurement command according to a preset rule to obtain an operation object and an operation type of the channel measurement command. The operation object of the channel measurement command is a measurement resource or a measurement report.

The command execution module 203 is configured to execute a first operation, corresponding to the operation type, on the measurement resource; and/or, execute a second operation, corresponding to the operation type, on the measurement report.

The operation type includes a deactivation operation, an activation operation, or a pause operation.

Specifically, the command receiving module 201 is configured to receive the channel measurement command sent by the base station; the command parsing module 202 is configured to parse the channel measurement command according to the preset rule to obtain the operation object and the operation type of the channel measurement command, where the operation object of the channel measurement command is the measurement resource or the measurement report; and the command execution module 203 is configured to execute the first operation, corresponding to the operation type, on the measurement resource, and/or, execute the second operation, corresponding to the operation type, on the measurement report.

In this embodiment, different operation objects (measurement reports and measurement resources) and operation types of the channel measurement commands are distinguished to perform different operations of the operation object, which solves the problem of waste of resources caused by binding the measurement report and the measurement resources in the existing method, and achieves the technical effort of saving resources by separately controlling measurement reports and measurement resources.

Further, on the basis of the above device embodiment, the command execution module 203 specifically is configured to:

if the operation object is the measurement resource and the operation type is the deactivation operation or the activation operation, record and determine that the base station has performed the corresponding deactivation or activation operation on the measurement resource, and/or, perform the corresponding deactivation or activation operation on the measurement report.

Further, on the basis of the above device embodiment, the command execution module 203 specifically is configured to:

if the operation object is the measurement resource and the operation type is the deactivation operation, set the measurement report to the pause state, step sending the measurement report to the base station, and record and determine status of the measurement report.

The status of the measurement report includes an activation state or a deactivation state.

Further, on the basis of the above device embodiment, the command execution module 203 specifically is configured to:

if the operation type is the activation operation, the measurement report is in the pause state and the status of the measurement report is the activation state, recover the activation state of the measurement report, and continue to send the measurement report to the base station.

Further, on the basis of the above device embodiment, the command execution module 203 specifically is configured to:

if the operation type is the deactivation operation or the activation operation, notify a physical layer to perform the corresponding deactivation or activation operation, so that the physical layer correspondingly stops or continues receiving the measurement resource.

Further, on the basis of the above device embodiment, the command execution module 203 specifically is configured to:

if the operation object is the measurement report, and the operation type is the deactivation or activation operation, record and determine that the base station has performed the corresponding deactivation or activation operation on the measurement resource, and/or, set the status of the measurement report to a corresponding deactivation or activation state, and perform the corresponding deactivation or activation operation on the measurement report.

Further, on the basis of the above device embodiment, the command execution module 203 specifically is configured to:

after a first preset quantity of sub-frames or a first preset quantity of slots, perform the corresponding deactivation or activation operation on the measurement report.

Further, on the basis of the above device embodiment, the command execution module 203 specifically is configured to:

if the operation object is the measurement resource, the operation type is the deactivation operation and the measurement report is in the activation state, replace the measurement resource;

when a new channel measurement command is received, if it is determined that an operation target of the new channel measurement command is the measurement report, and an operation type of the new channel measurement command is the deactivation operation, stop sending the measurement report to the base station.

Further, on the basis of the above device embodiment, measurement report includes a channel state information reference signal CSI-RS measurement report and a beam measurement report.

When reporting the CSI-RS measurement report, the measurement resource is a CSI-RS measurement resource or a demodulation reference signal DMRS measurement resource.

When reporting the beam measurement report, the measurement resource is the CSI-RS measurement resource or a synchronization information block (SS Block) measurement resource.

Further, on the basis of the above device embodiment, one measurement resource may correspond to one measurement report, or, one measurement resource may correspond to a plurality of the measurement reports, or, a plurality of measurement resources may correspond to one measurement report.

Further, on the basis of the above device embodiment, the device further includes a command ignoring module.

The command ignoring module is configured to ignore the channel measurement command according to a preset rule.

Further, on the basis of the above device embodiment, the command ignoring module is specifically configured to:

if status of the operation object corresponds to the operation type, ignore the channel measurement command.

The status of the operation object includes an activation state or a deactivation state.

The channel measurement processing device in this embodiment may be used to perform the foregoing method embodiment, and the principles and technical effects thereof are similar, and details are not described herein again.

The embodiment of present disclosure further provides a mobile terminal, including a processor, a memory and a computer program stored in the memory and executable by the processor. When the computer program is executed by the processor, the processor implements various processes of the channel measurement processing method, and the same technical effect can be achieved.

Figure 3:
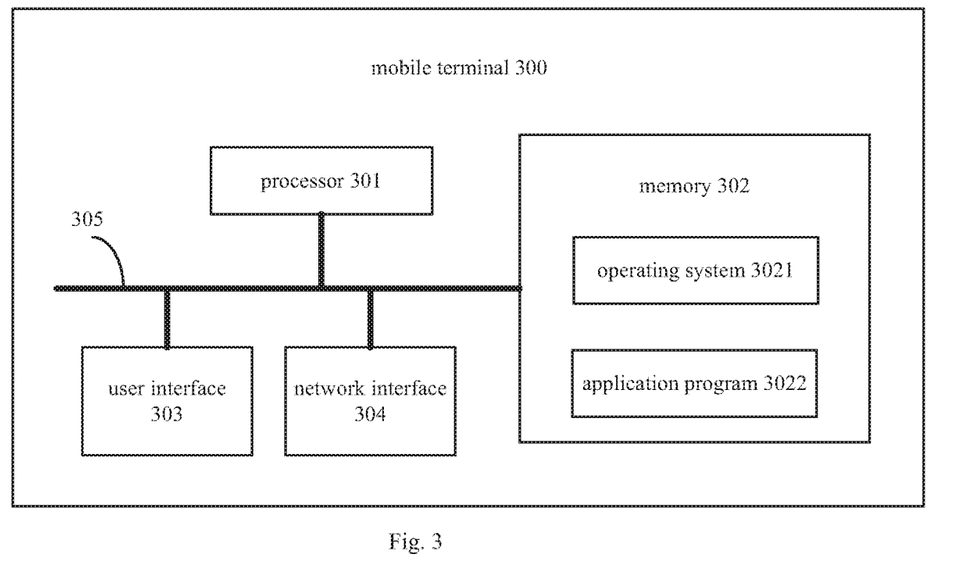
FIG. 3 is a block diagram illustrating a mobile terminal according to an embodiment of the present disclosure.

Specifically, FIG. 3 is a block diagram illustrating a mobile terminal according to another embodiment of the present disclosure. The mobile terminal 300 shown in FIG. 3 includes at least one processor 301, a memory 302, at least one network interface 304, and other user interfaces 303. The various components in the mobile terminal 300 are coupled together by a bus system 305. It will be appreciated that the bus system 305 is used to implement connection communication between these components. The bus system 305 includes a power bus, a control bus, and a status signal bus in addition to the data bus. However, for clarity of description, various buses are labeled as the bus system 305 in FIG. 3.

The user interface 303 may include a display device, a keyboard or a clicking device a mouse, a trackball, a touchpad or a touch screen, etc.)

It is to be understood that the memory 302 in the embodiment of the present disclosure can be either volatile memory or non-volatile memory, or can include both volatile and non-volatile memories. The non-volatile memory may be a Read-Only Memory (ROM), a Programmable ROM (PROM), an Erasable PROM (EPROM), or an Electrically EPROM (EEPROM) or a flash memory. The volatile memory can be a Random Access Memory (RAM) that acts as an external cache. By way of example and not limitation, many forms of RAM are available, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM) and Direct Rambus RAM (DRRAM). The memory 302 of the systems and methods described herein is intended to include, but is not limited to, these and any other suitable types of memory.

In some embodiments, the memory 302 stores the following elements, executable modules or data structures, or a subset thereof, or their extended set: an operating system 3021 and an application program 3022.

The operating system 3021 includes various system programs, such as a framework layer, a core library layer, a driver layer, and the like, for implementing various basic services and processing hardware—based tasks. The application 3022 includes various application programs, such as a media player, a browser, for implementing various application services. A program implementing the methods of the embodiments of the present disclosure may be included in the application program 3022.

In the embodiment of the present disclosure, by calling the program or instruction stored in the memory 302, specifically, which may be a program or an instruction stored in the application program 3022, the processor 301 is configured to: receive a channel measurement command sent by a base station; parse the channel measurement command according to a preset rule to obtain an operation object and an operation type of the channel measurement command, where the operation object of the channel measurement command is a measurement resource or a measurement report; execute a first operation, corresponding to the operation type, on the measurement resource, and/or execute a second operation, corresponding to the operation type, on the measurement report. The operation type includes a deactivation operation, an activation operation, or a pause operation.

The above method disclosed in the embodiment of the present disclosure may be applied to the processor 301 or implemented by the processor 301. The processor 301 may be an integrated circuit chip having a processing capability of signals. In the implementation process, each step of the foregoing method may be completed by an integrated logic circuit of hardware in the processor 301 or an instruction in a form of software. The processor 301 may be a general-purpose processor, a digital signal processor (DSP), an application specific integrated circuit (ASIC), a field programmable gate array (FPGA), other programmable logic devices, a discrete gate or transistor logic devices, or discrete hardware components. The methods, steps, and logical block diagrams disclosed in the embodiment of the present disclosure may be implemented or carried out. The general purpose processor may be a microprocessor, any conventional processor or the like. The steps of the method disclosed in the embodiment of the present disclosure may be embodied directly by the hardware decoding processor, or by a combination of hardware and software modules in the hardware decoding processor. The software module may be located in a conventional storage medium known in the art such as random access memory, flash memory, read only memory, programmable read only memory or electrically erasable programmable memory, registers, and the like. The storage medium is located in the memory 302, and the processor 301 reads the information in the memory 302 and completes the steps of the above method in combination with its hardware.

It is to be understood that the embodiments described herein can be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field-programmable gate arrays (FPGAs), general processors, controllers, micro-controllers, microprocessors, other electronic units designed to perform the functions described herein, or a combination thereof.

For software implementation, the techniques described herein may be implemented by modules (e.g., procedures, functions, etc.) that perform the functions described herein. The software codes may be stored in the memory and executed by the processor. The memory may be implemented within the processor or external to the processor.

Optionally, the operation type includes a deactivation operation, an activation operation, or a pause operation.

Optionally, the processor 301 is further configured to:

if the operation object is the measurement resource and the operation type is the deactivation operation or the activation operation, record or determine that the base station has performed the corresponding deactivation or activation operation on the measurement resource, and/or, perform the corresponding deactivation or activation operation on the measurement report.

Optionally, as another embodiment, the processor 301 is farther configured to:

if the operation object is the measurement resource, and the operation type is the deactivation operation, set the measurement report to the pause state, stop sending the measurement report to the base station, and record and determine status of the measurement report.

The status of the measurement report includes an activation state or a deactivation state.

Optionally, as another embodiment, the processor 301 is further configured to:

if the operation type is the activation operation, the measurement report is in the pause state and the status of the measurement report is the activation state, recover the activation state of the measurement report, and continue to send the measurement report to the base station.

Optionally, as a further embodiment, the processor 301 is further configured to:

if the operation type is the deactivation operation or the activation operation, notify a physical layer to perform the corresponding deactivation or activation operation, so that the physical layer correspondingly stops or continues receiving the measurement resource.

Optionally, the processor 301 is further configured to:

if the operation object is the measurement report, and the operation type is the deactivation or activation operation, record or determine that the base station has performed the corresponding deactivation or activation operation on the measurement resource, and/or, set status of the measurement report to a corresponding deactivation or activation state, and perform the corresponding deactivation or activation operation on the measurement report.

Optionally, the processor 301 is further configured to:

after a preset quantity of sub-frames or a preset quantity of slots, perform the corresponding deactivation or activation operation on the measurement report.

Optionally, the processor 301 is further configured to:

if the operation object is the measurement resource, the operation type is the deactivation operation and the measurement report is in an activation state, replace the measurement resource;

when receiving a new channel measurement command, if it is determined that an operation target of the new channel measurement command is the measurement report and an operation type of the new channel measurement command is the deactivation operation, stop sending the measurement report to the base station.

Optionally, the measurement report includes a channel state information reference signal CSI-RS measurement report and a beam measurement report.

When reporting the CSI-RS measurement report, the measurement resource is a CSI-RS measurement resource or a demodulation reference signal DMRS measurement resource.

When reporting the beam measurement report, the measurement resource is the CSI-RS measurement resource or a synchronization information block (SS Block) measurement resource.

Optionally, one measurement resource corresponds to one measurement report, or, one measurement resource corresponds to a plurality of the measurement reports, or, a plurality of measurement resources corresponds to one measurement report.

Optionally, the processor 301 is further configured to: ignore the channel measurement command according to a preset rule.

Optionally, the processor 301 is further configured to, if status of the operation object corresponds to the operation type, ignore the channel measurement command.

The status of the operation object includes an activation state or a deactivation state.

The mobile terminal 300 can implement various processes implemented by the channel measurement processing method in the foregoing embodiment. To avoid repetition, details are not described herein again.

One embodiment of the present disclosure further provides a computer readable storage medium. The computer readable storage medium stores a computer program. When the computer program is executed by the processor, the processor implements various processes of the foregoing channel measurement processing method embodiment, and can achieve the same technical effect, in order to avoid duplication, details are not described herein again. The computer readable storage medium, for example, may be a read-only memory (ROM), a random access memory (RAM), a magnetic disk, or an optical disk, etc.

Those of ordinary skill in the art will appreciate that the elements and algorithm steps of the various examples described in the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the embodiments provided by the present application, it should be understood that the disclosed device and method may be implemented in other manners. For example, the device embodiments described above are merely illustrative. For example, the division of the unit is only a logical function division. In actual implementation, there may be another division manner, for example, a plurality of units or components may be combined or may be integrated into another system, or some features can be ignored or not be executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed on multiple network units. Some or all of the units may be selected based on actual needs to achieve the purpose of the scheme of the embodiment.

In addition, each functional unit in various embodiments of the present disclosure may be integrated into one processing unit, or each unit may exist physically separately, or two or more units may be integrated into one unit.

If the functions are implemented in the form of software functional units and functions as an independent product for sale or use, it may also be stored in a computer readable storage medium. Based upon such understanding, the technical solutions of the present disclosure essentially or the part thereof contributing to the related art can be embodied in the form of a computer program product which can be stored in a storage medium and which includes several instructions to cause a computer device (which may be a personal computer, a server, or a network device, etc.) to perform all or some steps of the method according to the respective embodiments of the present disclosure. The foregoing storage medium includes various media that can store program codes, such as a USB flash drive, a mobile hard disk, a ROM, a RAM, a magnetic disk, or an optical disk.

The above are merely the preferred embodiments of the present disclosure and shall not be used to limit the scope of the present disclosure. A person skilled in the art may make improvements and modifications without departing from the principle of the present disclosure, and these improvements and modifications shall also fall within the scope of the present disclosure. Therefore, the protection scope of the present disclosure should be determined by the scope of the appended claims.

What is claimed is:

1. A channel measurement processing method, comprising:

receiving a channel measurement command sent by a base station;

parsing the channel measurement command according to a preset rule to obtain an operation object and an operation type of the channel measurement command; wherein the operation object of the channel measurement command is a measurement resource or a measurement report; and performing at least one of executing a first operation, corresponding to the operation type, on the measurement resource, or, executing a second operation, corresponding to the operation type, on the measurement report;

wherein the operation type comprises a deactivation operation, an activation operation, or a pause operation.

2. The method according to claim 1, wherein the performing at least one of executing a first operation, corresponding to the operation type, on the measurement resource, or, executing a second operation, corresponding to the operation type, on the measurement report, specifically comprises:

if the operation object is the measurement resource, and the operation type is the deactivation operation or the activation operation, performing at least one of:

recording or determining that the base station has performed the corresponding deactivation or activation operation on the measurement resource, or, performing the corresponding deactivation or activation operation on the measurement report.

3. The method according to claim 2, wherein the performing the corresponding deactivation or activation operation on the measurement report, specifically comprises:
after a preset quantity of sub-frames or a preset quantity of slots, performing the corresponding deactivation or activation operation on the measurement report.

4. The method according to claim 1, wherein the performing at least one of executing a first operation, corresponding to the operation type, on the measurement resource, or, executing a second operation, corresponding to the operation type, on the measurement report, specifically comprises:
if the operation object is the measurement resource, and the operation type is the deactivation operation, setting the measurement report to the pause state, stopping sending the measurement report to the base station, and recording or determining status of the measurement report;
wherein the status of the measurement report comprises an activation state or a deactivation state.

5. The method according to claim 4, wherein the performing at least one of executing a first operation, corresponding to the operation type, on the measurement resource, or, executing a second operation, corresponding to the operation type, on the measurement report, specifically comprises:
if the operation type is the activation operation, the measurement report is in the pause state, and the status of the measurement report is the activation state, recovering the activation state of the measurement report, and continuously sending the measurement report to the base station.

6. The method according to claim 1, wherein the performing at least one of executing a first operation, corresponding to the operation type, on the measurement resource, or, executing a second operation, corresponding to the operation type, on the measurement report, specifically comprises:
if the operation type is the deactivation operation or the activation operation, notifying a physical layer to perform the corresponding deactivation or activation operation, so that the physical layer correspondingly stops or continues receiving the measurement resource.

7. The method according to claim 1, wherein the performing at least one of executing a first operation, corresponding to the operation type, on the measurement resource, or, executing a second operation, corresponding to the operation type, on the measurement report, specifically comprises:
if the operation object is the measurement report, and the operation type is the deactivation or activation operation, performing at least one of:
recording or determining that the base station has performed the corresponding deactivation or activation operation on the measurement resource, or,
setting status of the measurement report to a corresponding deactivation or activation state, and performing the corresponding deactivation or activation operation on the measurement report.

8. The method according to claim 1, wherein the performing at least one of executing a first operation, corresponding to the operation type, on the measurement resource, or, executing a second operation, corresponding to the operation type, on the measurement report, specifically comprises:
if the operation object is the measurement resource, the operation type is the deactivation operation, and the measurement report is in an activation state, replacing the measurement resource; and
when a new channel measurement command is received, if determining that an operation target of the new channel measurement command is the measurement report and an operation type of the new channel measurement command is the deactivation operation, stopping sending the measurement report to the base station.

9. The method according to claim 8, wherein the measurement report comprises a channel state information reference signal CSI-RS measurement report and a beam measurement report;
when reporting the CSI-RS measurement report, the measurement resource is a CSI-RS measurement resource or a demodulation reference signal DMRS measurement resource; and
when reporting the beam measurement report, the measurement resource is the CSI-RS measurement resource or a synchronization information block (SS Block) measurement resource.

10. The method according to claim 1, wherein one measurement resource corresponds to one measurement report, or, one measurement resource corresponds to a plurality of the measurement reports, or, a plurality of measurement resources corresponds to one measurement report.

11. The method according to claim 1, wherein the method further comprises:
ignoring the channel measurement command according to the preset rule.

12. The method according to claim 11, wherein the ignoring the channel measurement command according to the preset rule, specifically comprises:
if status of the operation object corresponds to the operation type, ignoring the channel measurement command;
wherein the status of the operation object comprises an activation state or a deactivation state.

13. A terminal device, comprising a processor, a memory and a computer program stored in the memory and executable by the processor; wherein when the computer program is executed by the processor, the processor implements steps of:
receiving a channel measurement command sent by a base station;
parsing the channel measurement command according to a preset rule to obtain an operation object and an operation type of the channel measurement command; wherein the operation object of the channel measurement command is a measurement resource or a measurement report; and
performing at least one of executing a first operation, corresponding to the operation type on the measurement resource, or, executing a second operation, corresponding to the operation type, on the measurement report;
wherein the operation type comprises a deactivation operation, an activation operation, or pause operation.

14. The terminal device according to claim 13, wherein when the computer program is executed by the processor, the processor implements:
if the operation object is the measurement resource, and the operation type is the deactivation operation or the activation operation, performing at least one of:
recording or determining that the base station has performed the corresponding deactivation or activation operation on the measurement resource,
or,
performing the corresponding deactivation or activation operation on the measurement report.

15. The terminal device according to claim 13, wherein when the computer program is executed by the processor, the processor implements:

if the operation object is the measurement resource, and the operation type is the deactivation operation, setting the measurement report to the pause state, stopping sending the measurement report to the base station, and recording or determining status of the measurement report;

wherein the status of the measurement report comprises an activation state or a deactivation state.

16. The terminal device according to claim 13, wherein when the computer program is executed by the processor, the processor implements:

if the operation type is the deactivation operation or the activation operation, notifying a physical layer to perform the corresponding deactivation or activation operation, so that the physical layer correspondingly stops or continues receiving the measurement resource.

17. The terminal device according to claim 13, wherein when the computer program is executed by the processor, the processor implements:

if the operation object is the measurement report, and the operation type is the deactivation or activation operation, performing at least one of:

recording or determining that the base station has performed the corresponding deactivation or activation operation on the measurement resource, or, setting status of the measurement report to a corresponding deactivation or activation state, and performing the corresponding deactivation or activation operation on the measurement report.

18. The terminal device according to claim 13, wherein when the computer program is executed by the processor, the processor implements:

if the operation object is the measurement resource, the operation type is the deactivation operation, and the measurement report is in an activation state, replacing the measurement resource; and when a new channel measurement command is received, if determining that an operation target of the new channel measurement command is the measurement report and an operation type of the new channel measurement command is the deactivation operation, stopping sending the measurement report to the base station.

19. The terminal device according to claim 13, wherein when the computer program is executed by the processor, the processor implements:

ignoring the channel measurement command according to the preset rule.

20. A nontransitory computer readable storage medium comprising a computer program stored thereon; wherein the computer program is executed by a processor to implement steps of:

receiving a channel measurement command sent by a base station;

parsing the channel measurement command according to a preset rule to obtain an operation object and an operation type of the channel measurement command; wherein the operation object of the channel measurement command is a measurement resource or a measurement report; and performing at least one of executing a first operation, corresponding to the operation type, on the measurement resource, or, executing a second operation, corresponding to the operation type, on the measurement report;

wherein the operation type comprises a deactivation operation, an activation operation, or a pause operation.

* * * * *